United States Patent [19]
Doherty et al.

[11] Patent Number: 5,524,914
[45] Date of Patent: Jun. 11, 1996

[54] TRAILER HITCH AND TOW BAR FOR PERSONAL WATERCRAFT

[75] Inventors: Mark Doherty; Kim Healy, both of San Diego, Calif.

[73] Assignee: D & H Products, Inc., San Diego, Calif.

[21] Appl. No.: 320,241

[22] Filed: Oct. 11, 1994

Related U.S. Application Data

[63] Continuation-in-part of Ser. No. 17,796, Jan. 24, 1994, Pat. No. Des. 358,570.

[51] Int. Cl.⁶ ..................................................... B60D 1/14
[52] U.S. Cl. ............................. 280/24; 114/270; 280/493
[58] Field of Search ........................ 280/493, 24; 114/270

[56] References Cited

U.S. PATENT DOCUMENTS

| D. 214,787 | 7/1969 | Whisnand | D12/162 |
|---|---|---|---|
| D. 325,020 | 3/1992 | Doherty | D12/317 |
| D. 358,570 | 5/1995 | Doherty et al. | D12/162 |
| 3,781,038 | 12/1973 | Bachel et al. | 280/493 |
| 3,797,846 | 3/1974 | Pevic | 280/493 |
| 4,353,563 | 10/1982 | Foster | 280/493 |
| 4,768,803 | 9/1988 | Hewitt et al. | 280/462 |
| 4,856,799 | 8/1989 | Hawn | 280/24 |
| 5,088,754 | 2/1992 | Skelton | 280/491 |
| 5,119,752 | 6/1992 | Doherty | 114/270 |
| 5,232,240 | 8/1993 | Johnson | 280/491.5 |

OTHER PUBLICATIONS

*You Can Take It With You,* —Splash, Dec. 1993, p. 104.

*Primary Examiner*—Mitchell J. Hill
*Attorney, Agent, or Firm*—Brown, Martin, Haller & McClain

[57] ABSTRACT

The tow bar and trailer hitch comprise a bracket having an attachment plate and a cylindrical sleeve which are mounted on the deck of the personal watercraft and a generally triangular rigid tow bar which has a first pin at its apex which is inserted into the sleeve to provide pivoting capability between the bracket and the front of the tow bar. A second pin or bolt is inserted through each of the legs extending from the corners of the base of the triangle and into corresponding attachment points on the underside of the trailer. The second pins also allow vertical pivoting movement between the tow bar and the trailer.

11 Claims, 2 Drawing Sheets

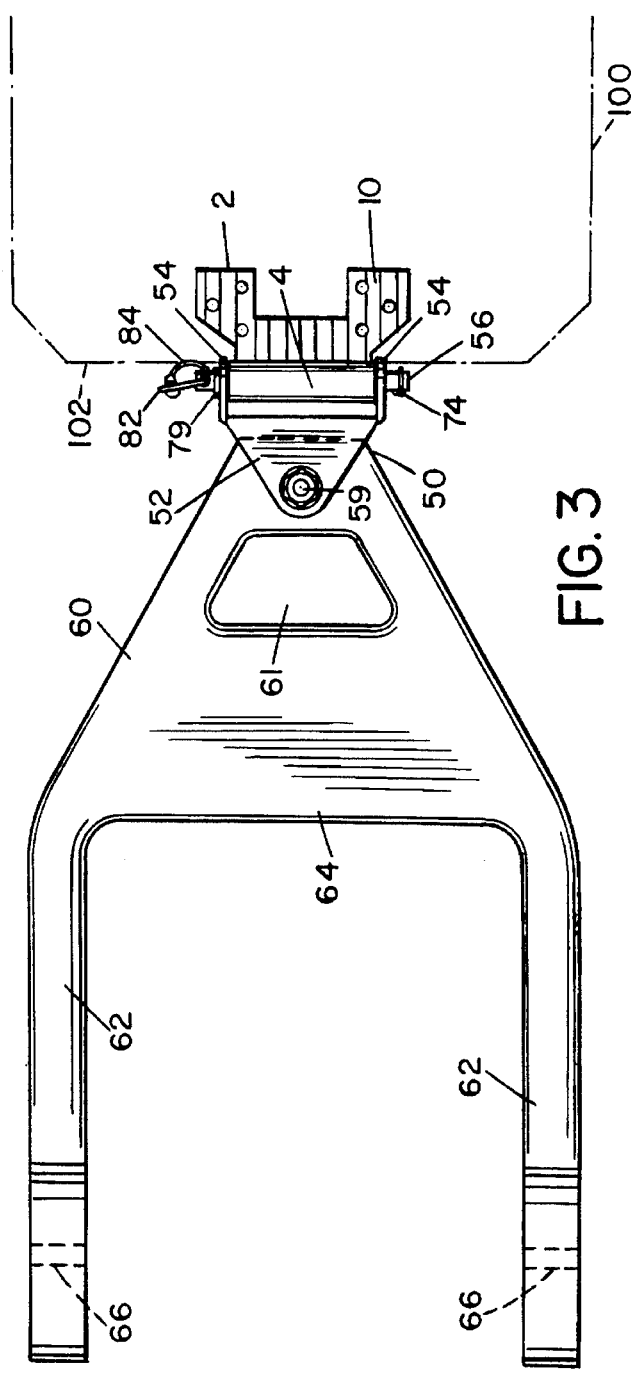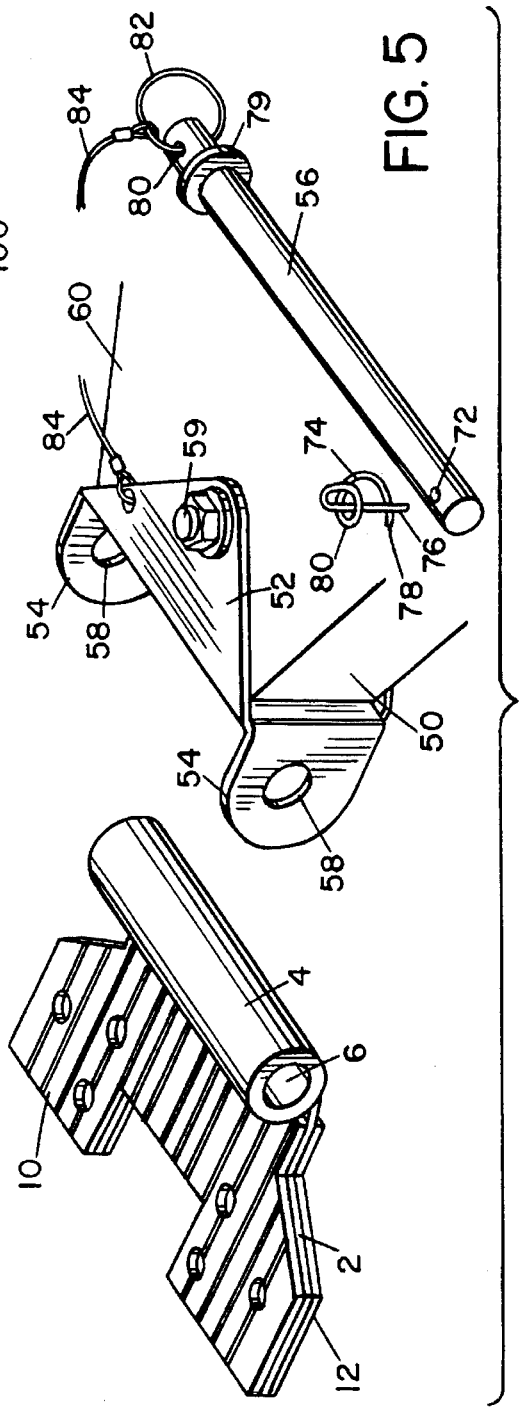

5,524,914

TRAILER HITCH AND TOW BAR FOR PERSONAL WATERCRAFT

CROSS-REFERENCES TO RELATED APPLICATIONS

This is a continuation-in-part of application Ser. No. 29/017,796, filed Jan. 24, 1994 now issued as U.S. Pat. No. Des. 358,570.

BACKGROUND OF THE INVENTION

Personal watercraft have become popular for both recreational and utility purposes. Recreational uses include not only running laps or loose circuits within a relatively limited area, e.g., bays, small lakes, etc., but also extended trips for exploration of isolated areas and even inter-island or continent-to-island adventures.

A significant problem which has been encountered by recreational personal watercraft enthusiasts is that their range is limited both by the watercraft's fuel capacity and the possible need for tools, recreational or camping gear, drinking water and food, etc. A solution to this problem was disclosed by one of the present inventors in U.S. Pat. No. 5,119,752 for a "Trailer for Personal Motorcraft" and U.S. Pat. No. Des. 325,020. A water-tight pod is operable to store supplies, food, etc., and the upper surface of the pod has areas for retaining fuel cans and larger gear.

Other trailers for personal watercraft have recently become commercially available. Many of the trailers are simple sealed containers which are dragged behind the watercraft with a tow rope. Historically, virtually all watercraft, large and small, have utilized non-rigid ropes or cables for pulling one craft behind another. When the towed craft is large enough and when the towing craft does not reach relatively high speeds, a tow rope produces the desired result, i.e., that of transferring the forward force of the towing craft to the towed craft. However, both personal watercraft and their trailers are small, and can travel at relatively high speeds, making the trailers more susceptible to waves, chop and wakes of the watercraft or other boats, which can lead to wide lateral deviations, severe bouncing and flipping. While such behavior may be tolerable if all the user's supplies and gear are securely towed within the trailer, anything on the outside of the trailer may be lost or damaged. Further, personal watercraft are capable of sharp turns and precision, high speed maneuvering. The use of a tow rope causes a delayed response in the trailer such that the trailer can jackknife or whiplash, endangering the watercraft's riders. Yet another disadvantage of tow ropes is that the lack of lateral stability permits the front of the trailer to dig into or rise above the water level depending on the water conditions and the watercraft's speed, creating variable drag. This variable drag is not only uncomfortable for the rider, but may be dangerous. The rider may be "bucked" off of the motorcraft, or the trailer might "pearl", digging its bow into the water sufficiently deeply to cause it to flip end-over-end.

The applications of personal watercraft have expanded to utility situations, for construction, maintenance, inspections, etc., where tools are required, and to rescue applications for use by lifeguards and emergency service personnel. While it is important that sufficient capacity be provided for tools and equipment, and that they not be lost due to the trailer tipping or capsizing, it is especially important in a rescue situation that the trailer stay upright when it is carrying an injured, unconscious and/or sick victim. Thus, an alternative to the common tow rope is required to allow personal watercraft trailers to attain their full utility potential.

SUMMARY OF THE INVENTION

It is an advantage of the present invention to provide a rigid tow bar for towing a trailer behind a personal watercraft.

It is an advantage of the present invention to provide a trailer hitch for attaching a trailer to a personal watercraft that can be quickly fastened and released.

In an exemplary embodiment, the tow bar and trailer hitch comprise a bracket having an attachment plate and a cylindrical sleeve which are mounted on the deck of the personal watercraft and a generally triangular rigid tow bar which has a first pin at its apex which is inserted into the sleeve to provide pivoting capability between the bracket and the front of the tow bar. A second pin or bolt is inserted through each of the legs extending from the corners of the base of the triangle and into corresponding attachment points on the underside of the trailer. The second pins also allow vertical pivoting movement between the tow bar and the trailer.

The first pin has a quick release mechanism consisting of a diametric bore through one end through which a locking ring, cotter pin or the like can be inserted. The second end of the first pin has a stop in the form of a flange, head or ring which has a diameter larger than the sleeve opening to prevent movement of the pin beyond the stop, and a cable is attached to the second end to allow attachment to the trailer hitch to prevent its loss.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which:

FIG. 3 is a top view of the trailer hitch and tow bar;

FIG. 5 is an exploded perspective view of the attachment mechanism.

DESCRIPTION OF THE PREFERRED EMBODIMENT

Figure 1:
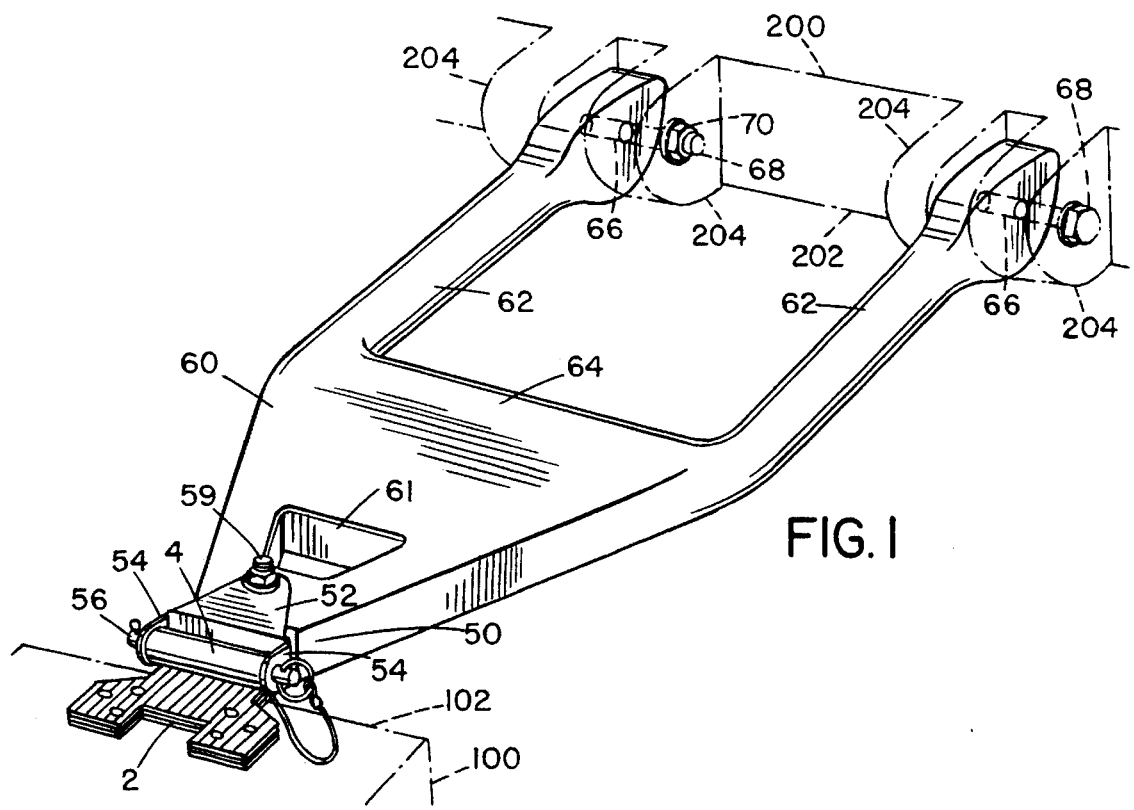
FIG. 1 is a perspective view of the trailer hitch and tow bar.
Figure 2:
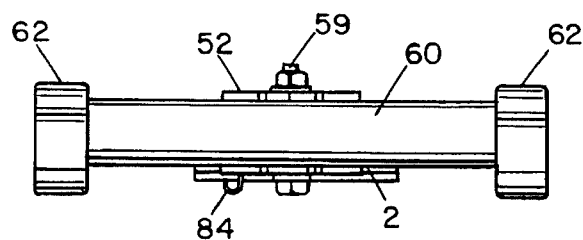
FIG. 2 is a rear view of the tow bar.
Figure 4:
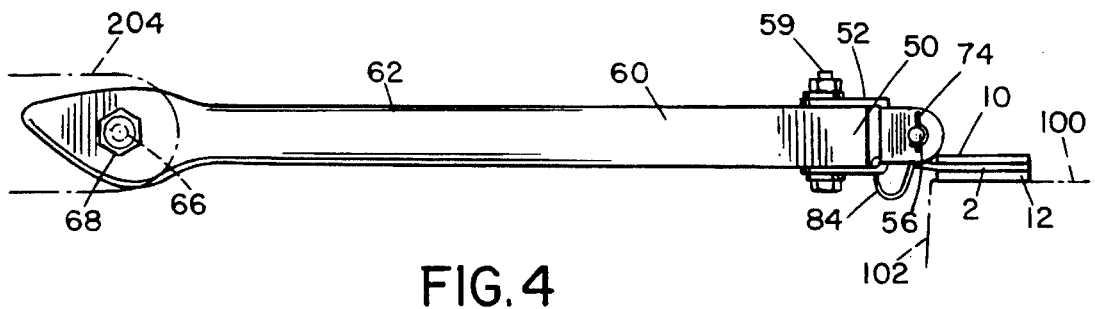
FIG. 4 is a side elevation of the trailer hitch and tow bar.

As illustrated in FIGS. 1–4, the trailer hitch comprises a bracket 2 with a cylindrical sleeve 4 rigidly attached so that the axis of sleeve 4 is perpendicular to the plane of bracket 2.

Bracket 2 is attached to the rear deck 100 of the watercraft (indicated with dashed lines) so that the sleeve 4 extends over the rear edge 102.

The tow bar comprises a generally triangular shape which provides three contact points. At the apex 50 a bracket 52 with two supports 54 has a removable pin 56 extending therethrough to define a first contact point. The spacing between supports 56 is sufficiently wide to accommodate cylindrical sleeve 4 within it. The holes 58 in supports 54 align with bore 6 through sleeve 4 so that pin 56 can be inserted through both. The bracket 52 is preferably stainless steel or other high strength, corrosion-resistant metal.

In the preferred embodiment, the body 60 of the tow bar is a lightweight but durable hollow molded plastic or polymer, such as polypropylene. The bracket 50 attaches to the body 60 substantially rigidly, using a bolt 59 so that there is minimal relative movement between the bracket 50 and body 60. The central cut-out 61 strengthens the tow bar against bending or compression as well as improving the aesthetics of the body. If the tow bar is made of solid material, cut-out 61 may be eliminated if desired.

Two legs 62 extend rearward from the base 64, the triangular shape to provide two second contact points to the trailer 200 (indicated with dashed lines) on its lower portion 202. The legs have bores 66 running in a direction parallel to the triangle's base 64 in a manner adapted to align with corresponding openings in the attachment points 204 of the trailer. As shown in FIG. 5, the attachment points 204 consist of pairs of tabs extending from the lower portion 202 with spacings between a pair of tabs corresponding to the width of the ends of legs 62, with a small amount of vertical play permitted between the legs and attachment points. Pins or threaded bolts 68 may be inserted through bores 66 and attachment points 204 and fastened with nuts 70 to permit relative vertical movement pivoting along on axis created by bolts 68 between the trailer 200 and tow bar.

The releasable pin 56 which is used to connect the trailer hitch to the tow bar has a diameter to freely pass through bore 6 and holes 58, and a length such that it extends out of the opposite side of the bracket 54 from which it was inserted. A bore 72 through the first end of pin 56, shown in FIG. 5, is adapted for receiving a locking ring 74 or similar locking device.

Referring to FIG. 5, the bore 6 of sleeve 4 may be lined with a self-lubricating material such as Teflon to prevent binding between the pin 56 and sleeve which may occur if either the pin or bore 6 becomes corroded or fouled with dirt or other material. Locking ring 74, shown in detail in FIG. 5, has a straight pin section 76 which slides through bore 72. End 78 is bent generally perpendicular to straight section 76 and can be flexed to lock underneath straight section 76 once inserted. Center ring 80 has an inner diameter slightly larger than the diameter of pin 56 so that, once inserted, the ring 80 wraps around the pin 56. The metal of which locking ring 74 is formed is sufficiently flexible and resilient so that it can repeatedly be expanded during assembly and disassembly and still retain its ability to resile to provide forces to lock it in place.

The second end of pin 56 has another bore 80 through which an attachment ring 82 may be inserted as well as a stop 79 in the form of a flange, head or the like to prevent the pin from passing completely through bore 6. A narrow cable 84 ties the pin 56 to bracket 52 to prevent loss of the pin 56 when it is not in place for locking. Other means for attachment of a cable or other retention means may be provided to avoid loss of the pin.

For attachment of the trailer hitch to the watercraft, at least two holes are drilled in the deck so that bracket 2 is centered at the rear of the deck with sleeve 4 extending just beyond the edge 102. Conventional screws or nuts and bolts are used to attach the bracket 2.

In order to avoid injury that might occur from stepping on a metal edge with softened, water-soaked feet, the bracket 2 may be covered with a neoprene or similar-material gasket 10. Also, it may be desirable to provide a gasket 12 between the bracket 2 and deck 100 for cushioning.

While the triangular shape of the tow bar is not, in itself, critical, it is important to emphasize that the tow bar needs to contact the trailer at more than a single point. A single point of contact at the trailer does not provide rotational stability between the trailer and watercraft, and the trailer could incur sufficient buffeting to rotate around the tow bar, breaking the connection if the bar is rigid, or capsizing the trailer if the towing means is a rope. As an alternative, for example, a straight hinge on the order of 6 inches wide, attached across the front of the trailer should provide sufficient lateral contact to prevent rotation around the tow bar.

Another important aspect of the invention is the vertical pivoting capability, which, in the preferred embodiment, is provided at both the connection between the watercraft and tow bar and between the tow bar and the trailer. This provides the flexibility needed to ride over waves and wakes without such a rigid connection that the watercraft's inertial stability is seriously altered.

In the preferred embodiment, the inventive trailer hitch and tow bar combination rigidly attaches the trailer to a personal watercraft, preventing lateral movement of the trailer with respect to the watercraft while still permitting pivoting at two points to provide limited vertical motion. This keeps the trailer in the same plane as the watercraft so that items stored within the trailer are not constantly shifting. Further the trailer does not move sufficiently relative to the watercraft to create variable drag from the bobbing and bouncing that can occur when towed by a rope. Notwithstanding the preference for limited lateral movement between the watercraft and the trailer, lateral movement may be provided by substituting the sleeve-and-pin combination with a ball and cup, or by orienting the sleeve-and-pin combination vertically. In the latter, relative vertical movement would be provided exclusively by the connection between the tow bar and the trailer.

The rigid nature of the tow bar provides the stability required for assuring that a trailer towed behind a personal watercraft remains upright and stable. This is critical in a situation in which the personal watercraft is employed for rescues, where a trailer, as disclosed in U.S. Pat. No. 5,119,752, is modified, primarily by lengthening the trailer and decreasing the depths of the recessed areas to accommodate a person's body when reclining. Since rescues often occur in harsh weather or rough conditions, stability of the transport trailer is an absolute necessity. Further, the rescuer is going to want to take advantage of the watercraft's speed, as much as possible, to transport the victim quickly. Thus, the rigid tow bar of the present invention addresses the drawbacks of the conventional practice of towing a trailer behind a boat using only a rope.

It will be evident that there are additional embodiments which are not illustrated above but which are clearly within the scope and spirit of the present invention. The above description and drawings are therefore intended to be exemplary only and the scope of the invention is to be limited solely by the appended claims.

We claim:

1. A trailer hitch and tow bar combination for releasably attaching a trailer behind a personal watercraft for towing, the combination comprising:

a bracket fixedly attached to a rear portion of said personal watercraft, said rear portion having a rear edge;

a sleeve attached to said bracket and extending at least partially beyond the rear edge of said rear portion of said personal watercraft, said sleeve having an inner diameter;

a rigid tow bar having at least three contact points, a first contact point being releasably attached to said sleeve and at least two second contact points being pivotally attached to a forward portion of said trailer; and a pin which is generally cylindrical in shape and having a first end, a second end and an outer diameter smaller than the inner diameter of said sleeve whereby said pin is slidable and pivotable within said sleeve along an axis extending along a length of said pin.

2. A device as in claim 1 wherein said pin has a releasable locking means at a first end and a stop at a second end for preventing said second end from passing through said sleeve.

3. A device as in claim 2 wherein said pin has a bore diametrically through its first end, said releasable locking means comprises a spring wire locking ring formed of wire having a diameter smaller than a diameter of said bore so that said locking ring can be inserted into said bore.

4. A device as in claim 1 wherein said sleeve and said pin are each disposed in a horizontal orientation, parallel to said rear edge.

5. A device as in claim 1 wherein said tow bar is formed of a molded plastic or polymer.

6. A trailer hitch and two bar combination for pulling a floating trailer behind a personal watercraft having a rear deck, the combination comprising:

a trailer hitch comprising:

a bracket fixedly attached to a rear portion of said personal watercraft;

a first attachment means attached to and extending from said bracket; and a tow bar comprising:

a rigid body having at least three contact points in a common plane, a first contact point having a second attachment means disposed thereon, said second attachment means for releasably mating with said first attachment means, and at least two second contact points pivotally attached to a forward portion of a lower surface of said floating trailer so that said body and said trailer have vertical movement with respect to each other;

wherein one of said first attachment means and said second attachment means is a sleeve with an inner diameter and the other of said first attachment means and said second attachment means is cylindrical pin having an outer diameter smaller than said inner diameter.

7. A device as in claim 6 wherein said bracket is attached to a rear deck of said personal watercraft.

8. A device as in claim 6 wherein said first attachment means is a sleeve with an inner diameter and said second attachment means is a cylindrical pin having an outer diameter smaller than said inner diameter.

9. A device as in claim 8 wherein said sleeve and said pin are disposed in a horizontal orientation parallel to the rear deck of said personal watercraft.

10. A device as in claim 9 wherein said first and second attachment means permit relative vertical movement between said personal watercraft and said body.

11. A device as in claim 6 wherein said body is a molded plastic or polymer.

* * * * *

UNITED STATES PATENT AND TRADEMARK OFFICE
CERTIFICATE OF CORRECTION

PATENT NO. : 5,524,914
DATED : June 11, 1996
INVENTOR(S) : Mark Doherty and Kim Healy It is certified that error appears in the above-indentified patent and that said Letters Patent is hereby corrected as shown below:

COLUMN 5, CLAIM 6, LINE 22, CHANGE "TWO" TO --TOW--;
COLUMN 6, CLAIM 6, LINE 13, AFTER "IS" INSERT --A--.

Signed and Sealed this

Eighth Day of October, 1996

Attest:

BRUCE LEHMAN

Attesting Officer     Commissioner of Patents and Trademarks